United States Patent [19]

Peterson et al.

[11] Patent Number: 5,170,108
[45] Date of Patent: Dec. 8, 1992

[54] MOTION CONTROL METHOD AND APPARATUS FOR MOTORIZED WINDOW BLINDS AND AND THE LIKE

[75] Inventors: James E. Peterson, Denver; Robert W. Collett, Arvada, both of Colo.

[73] Assignee: Daylighting, Inc., Denver, Colo.

[21] Appl. No.: 648,648

[22] Filed: Jan. 31, 1991

[51] Int. Cl.⁵ .............................................. H02P 5/00
[52] U.S. Cl. ................... 318/469; 318/266; 318/286
[58] Field of Search ............... 318/250, 264, 265, 266, 318/267, 280, 282, 283, 284, 285, 286, 293, 466, 467, 468, 469, 16, 603, 626, 628; 49/26, 28, 348, 349

[56] References Cited

U.S. PATENT DOCUMENTS

| | | | |
|---|---|---|---|
| 4,463,300 | 7/1984 | Mayne et al. | 318/687 |
| 4,698,622 | 10/1987 | Goto et al. | 318/261 X |
| 4,713,591 | 12/1987 | McCloskey | 318/257 |
| 4,736,144 | 4/1988 | Hsu Chun-Pu | 318/467 |
| 4,775,823 | 10/1988 | Yoshida et al. | 318/266 |
| 4,870,333 | 9/1989 | Itoh et al. | 318/286 |
| 4,922,168 | 5/1990 | Waggamon et al. | 318/286 |
| 4,942,346 | 7/1990 | Ardit et al. | 318/280 |
| 4,965,502 | 10/1990 | Ogasawara | 318/628 |
| 4,980,618 | 12/1990 | Milnes et al. | 318/625 |
| 4,994,724 | 2/1991 | Hsu | 318/603 |

*Primary Examiner*—Bentsu Ro
*Attorney, Agent, or Firm*—John E. Reilly

[57] ABSTRACT

A motor controller for reversibly driving a member to be driven along a predetermined path of travel is capable of sensing the speed of the member to be driven and to compare with a predetermined speed level and to adjust the motor drive until the rate of advancement of the driven member corresponds with the predetermined speed level. The motor drive means is completely deactivated if the actual speed should not reach a predetermined start-up threshold within a selected time interval after the motor is initially turned on or should drop beneath the stay-on threshold level which is set beneath the desired speed. The motor drive can also be regulated to run at different reduced or normal speed settings depending upon its intended application.

9 Claims, 6 Drawing Sheets

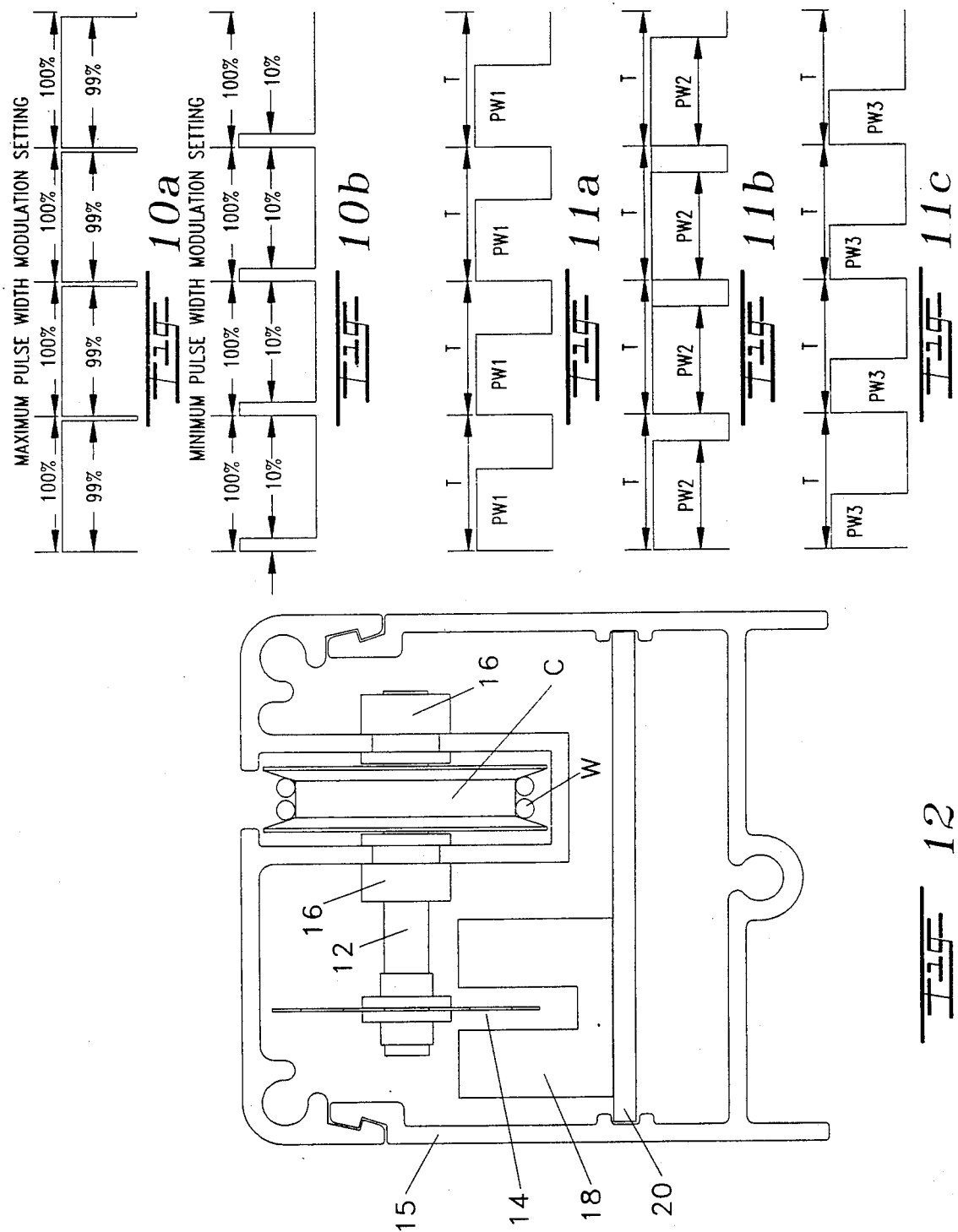

MOTION CONTROL METHOD AND APPARATUS FOR MOTORIZED WINDOW BLINDS AND AND THE LIKE

This invention relates to motion detection switches for motorized control systems; and more particularly relates to a novel and improved motor control circuit and motion detection switch therefor which is specifically adaptable for use in switching off power to the motive power source for a window shade in direct response to sensing an obstruction in the path of travel of the shade.

BACKGROUND AND FIELD OF INVENTION

Motorized control systems are in widespread use in advancing objects between one or more positions and where it is important to control cut-off of the motor drive immediately upon reaching a selected position or upon sensing an obstruction so that the motor or drive system is not damaged as a result of permitting the motor to run any length of time after the position or obstruction is reached. This problem is typified by the operation of window shades or blinds wherein the blind is normally intended to advance between upper and lower open and closed positions but often may encounter unexpected interference or obstructions in its path of travel. Unless the motive source of power can be stopped immediately, damage may be inflicted on one or more of the blinds, drive system and the power source.

Different approaches have been taken to solving the aforementioned problem, such as, by counting the number of revolutions between the end limits of travel of the blind, the use of limit switches at opposite end limits as well as the use of magnetic and piezoelectric motion sensors. Representative patents in this area which utilize the approaches discussed are U.S. Letters Patent Nos. 3,330,922 to R. E. Rowe, 3,559,024 to H. Marder, 4,319,236 to P. H. Brace et al, 4,665,965 to H. Pasquier et al, 4,735,251 to E. Tsuchida et al, 4,758,824 to P. Young and 4,856,574 to K. Minami et al. Nonetheless, none of these has suggested solving the problem by sensing the change in rate of signals or pulses generated in direct correlation with the rate of travel of the blind whereby the motive power source can be switched off immediately to avoid possible damage at any point along the path of travel. In sensing pulse rate changes, the system can achieve simplicity yet versatility in simultaneously controlling one or more moving objects, such as, window blinds in opening and closing over wide ranges in speeds and distances.

SUMMARY OF INVENTION

It is therefore an object of the present invention to provide for a novel and improved motion detection device for a motive power source in closely controlling the movement of an object between different selected positions in an accurate and efficient manner.

Another object of the present invention is to provide for a novel and improved motion detection switch for motorized control circuits utilized to control opening and closing of window shades and which is so constructed and arranged as to be capable of sensing obstructions in the path of travel of the shades and of immediately switching off the circuit in response thereto.

A further object of the present invention is to provide for a novel and improved motorized control system which is conformable for use in controlling the movement of various devices in response to changes in pulse rate measured as a function of the rate of motion of the device being driven; and further wherein one or more devices may be driven at different rates of speed and driven at either a constant rate or intermittently between opposite end limits.

In accordance with the present invention, a motion control system has been devised for reversibly driving a member to be driven along a predetermined path of travel and which comprises speed-sensing means for sensing the rate of advancement of the member to be driven along the path of travel, speed control means for establishing a predetermined speed level at which the member is to be driven, signal-generating means for generating drive signals for driving the motor drive means, and comparator means for comparing the rate of advancement of the driven member as sensed by the speed-sensing means and the speed level established by the speed control means to adjust the drive signals until the rate of advancement of the driven member corresponds with the predetermined speed level. An important feature of the motion control system also resides in the speed control means establishing a minimum speed level in addition to the predetermined speed level below which the motor drive means will be deactivated, for example, when the driven member encounters an obstruction along the path of travel. The speed control means is further characterized by establishing another minimum speed level which must be reached by the motor drive means within a predetermined time interval after the motor drive means is started up and will deactivate the motor drive means if that minimum speed level is not reached.

Preferably, the signal-generating means takes the form of a pulse modulation circuit having a closed feedback loop associated with the speed-sensing means for modulating the width of signals, or pulses, for accelerating or decelerating the motor drive means until it reaches the predetermined speed level or range. The speed sensing means in turn may take the form of various different types of transducers which will accurately sense the rate of advancement of the driven member, such as, an optical interrupter circuit made up of a light beam and slotted optical disk which rotate synchronously with a drive pulley on the motor drive.

Still further in accordance with the present invention, a novel and improved method of controlling speed of advancement of a window blind between open and closed positions and for stopping the movement of the blind in the event of an obstruction comprises the steps of providing a drive member for reversibly driving the blind, sensing the rate of advancement of the blind when the drive member is activated, establishing upper and lower normal speed levels within which the blind is to be advanced by the drive member, further establishing a minimum speed level below which the drive member is deactivated, comparing the rate of advancement of the blind with the upper and lower normal speed levels and adjusting the rate of advancement until it is between the upper and lower normal speed levels, and deactivating the drive member in the event that the rate of advancement is below the minimum speed level.

The above and other objects, advantages and features of the present invention will become more readily understood and appreciated from a consideration of the following detailed description of a preferred embodiment thereof when taken together with the accompanying drawings, in which:

BRIEF DESCRIPTION OF THE DRAWINGS

FIGS. 10A and 10B are timing diagrams of the maximum and minimum pulse width modulation settings, respectively, of the control circuit;

FIGS. 11A, 11B and 11C are timing diagrams illustrating adjustments made to the pulse width by the microprocessor in controlling motor speed; and FIG. 12 is a view in more detail showing the interconnection of the cable loop to an idler pulley for the purpose of rotating an optical disk to sense the speed of advancement of the window shade.

DETAILED DESCRIPTION OF THE PREFERRED EMBODIMENT

Figure 1:
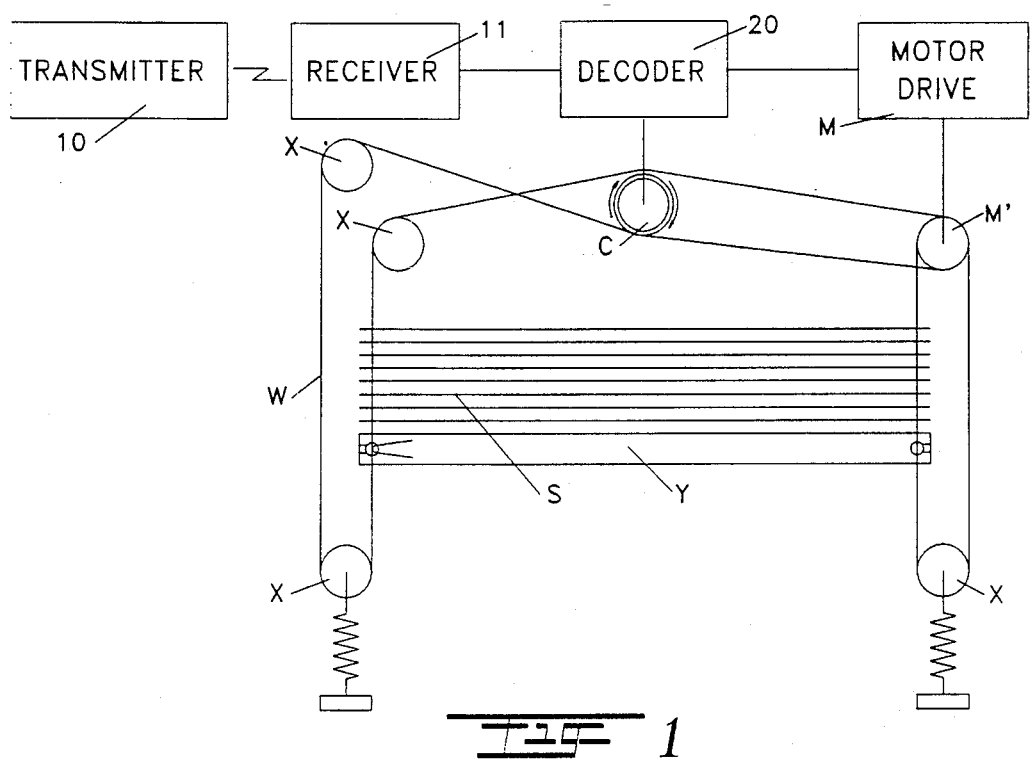
FIG. 1 is a somewhat schematic view functionally illustrating the interconnection of the preferred form of motor controller in a cable loop system for a window shade.
Figure 2:
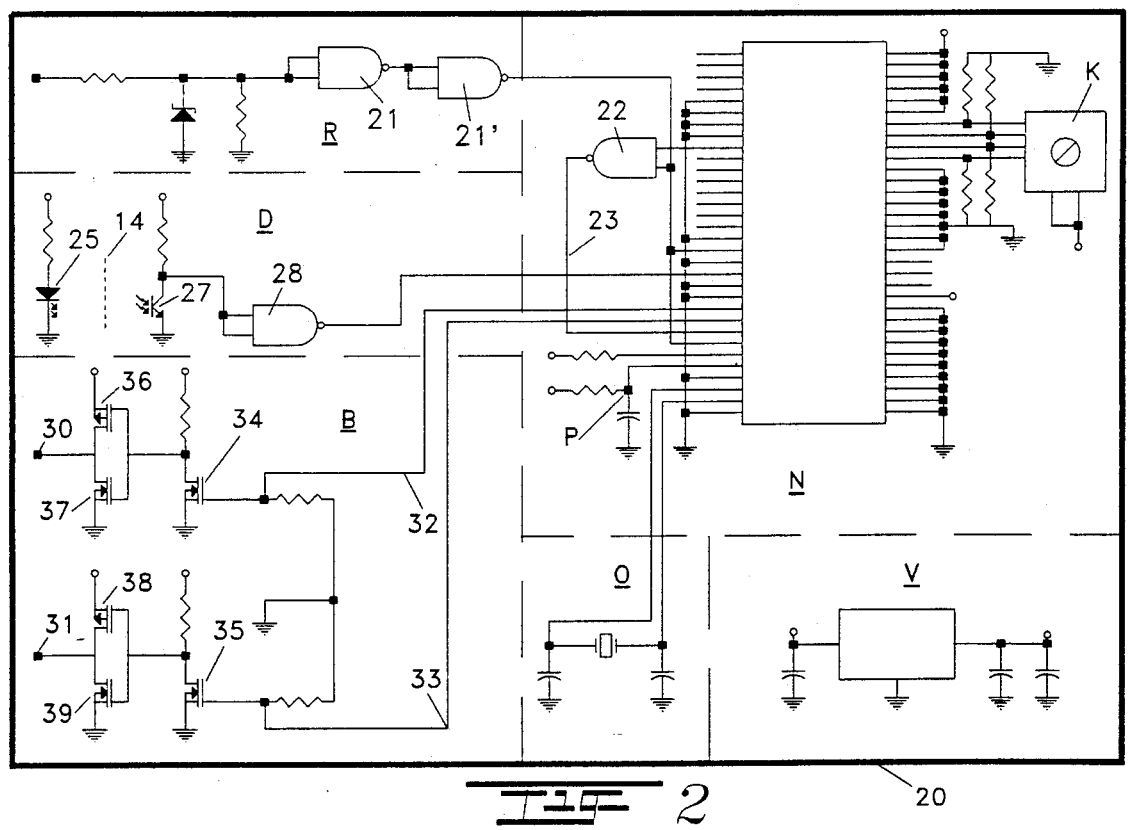
FIG. 2 is a schematic illustration in more detail of a limit switch decorder circuit, in accordance with the present invention.

Referring in more detail to the drawings, FIG. 1 illustrates a motor driven cable loop system adapted for use in controlling the opening and closing of one or more window shades as represented at S. For each shade S as illustrated, a cable W is trained over a series of pulleys X and connected to a moving shade rail Y. Motion is imparted to the cable W via gear train into idler pulley C. As shown in FIGS. 1 and 2, a drive pulley M' is operated off of a DC motor drive M, and the motor speed is controlled by a limit switch decoder circuit, as shown in FIG. 2, having a receiver 11 for a single shade or group of shades S. In the preferred form, an infrared remote control system in the form of a handheld transmitter 10 is utilized to control individual shades or groups of shades and the transmitter contains ten single station keys numbered "1" through "10" along with three command keys "OPEN", "CLOSE", and "STOP". The single station number is matched with the identification number given to each shade or group of shades by setting a rotary switch K on the limit switch decoder circuit board 20 as shown in FIG. 2. Single station control is intiated by pressing a station number key and then a command key; whereas simultaneous control of all shades is accomplished by pressing only a command key directly without a station number. In single station or simultaneous station control, it is not necessary to hold down any key once the shade responds to the command.

An additional "JOG" control function enables control of the position of each individual shade S and operates at a reduced speed. Here, the operator may press the station number twice and then hold down the "OPEN" or "CLOSE" key to maintain shade motion at a reduced speed in the chosen direction. When the shade reaches the desired position, the operator releases the command key to stop the shade.

As best seen from FIGS. 1 and 12, the limit switch decoder circuit 20 for each shade S includes a shaft 12 with the pulley C attached at one end and a slotted optical disk 14 attached to the other end. This shaft assembly is supported within a case 15 by bearings 16 on either side of the pulley C. The optical disk 14 is positioned within the slot of an optical switch 18 which is mounted on the circuit board 20 within the casing 15. The casing 15 completely encloses the printed circuit board 20, optical switch 18 and slotted disk 14 to effectively encapsulate the assembly and prevent entry of light. The pulley C is exposed within a slot 19 in the case 15 to permit wrapping of loops of the cable W coming directly from the motorized capstan M'.

When the shade S is running, the cable W moving the shade S also rotates the pulley C which in turn rotates the optical disk 14. The optical switch generates electrical pulses as a result of an interruption of an infrared beam from an LED 25 by the slots in the rotating disk 14, as represented in FIG. 2.

As further illustrated in FIG. 2, the decoder circuit 20 includes a microprocessor N which is controlled in a well-known manner by an oscillator circuit designated at O, and a voltage regulator circuit V regulates the voltage to supply a steady state voltage, in this case 5 volts, to the microprocessor N and other parts of the controller circuit to be described. When a signal is transmitted by the transmitter 10 and received at receiver 11, that signal is converted into a square wave pulse by NAND gates 21 and 21' in the receiver pulse conditioning circuit R or, in other words, converted from an infrared pulse into an electrical pulse which is amplified. When a receiver pulse is applied to turn on the microprocessor N, that pulse is also applied to the input of a NAND gate 22 having an output line 23 to the microprocessor N so as to lock out any subsequent receiver pulses.

The optical interrupter circuit D is broadly comprised of a light source in the form of the LED 25 which is applied across the path of the optical disk 14 to a phototransistor 27 whereby to generate pulses at a rate corresponding to the rate of rotation of the optical disk 14. As noted earlier, the optical disk 14 will rotate at a rate correlated with the speed of advancement of the window blind S when it is driven by the motor M, and the pulses generated are shaped by a Schmitt trigger or NAND gate 28 into square wave pulses which are then input to the microprocessor N. A POWER ON reset circuit generally designated at P serves to stabilize the microprocessor circuit N before running.

A bidirectional motor drive circuit B includes pins 30, 31 which are connected to the motor M. The microprocessor circuit N compares the pulses received from the optical interrupter circuit D with upper and lower threshold values, in a manner to be described, and from that generates a motor drive pulse or series of pulses whose magnitude or width will cause the motor either to speed up or slow down to remain within the threshold limits. The motor drive pulses from the microprocessor N are directed over lines 32 and 33 into drive transistors 34 and 35, respectively, to amplify the pulses. The pulses are then directed from the transistors 34 and 35 into a pair of polarity-switching transistors. Thus, drive transistor 34 is connected to polarity switching transistors 36 and 37, and the drive transistor 35 is connected to the transistors 38 and 39. In this way, the transistors effectively form an H-bridge circuit to reversibly drive the motor M according to the polarity of the pulses. Reference is made to FIGS. 11A, 11B and 11C which illustrate the manner in which motor speed is regulated in response to the pulses received from the phototransistor 27. Thus, the output wave form in FIG. 11A shows a pulse width "PW1" when power is on during the fixed time period "T". If the spacing between optical pulses is greater than a predetermined time interval, indicating that the motor speed is below a particular threshold value, the motor speed is increased by increasing the pulse width to "PW2" as shown in FIG. 11B over the same time period "T". Conversely, if the time period between optical pulses is shorter than a predetermined time interval, indicating that the motor speed is in excess of the threshold level, the motor drive pulse width is decreased as indicated at "PW3" in FIG. 11C thereby decreasing the motor speed. Accordingly, the switching and drive transistors in the H-bridge circuit as described will establish pulse width modulation based on the rate of optical switch pulses detected through a closed feedback loop. Typically, the optical pulse rate is compared with predetermined pulse rates as described which correspond to the upper and lower thresholds for normal speed and reduced speed travel of the blind, or, in other words, define upper and lower acceptable speed ranges for normal speed. If the shade speed is faster than the upper speed threshold, the motor pulse width is reduced to reduce the actual speed of shade movement; and, if the shade speed is slower than the lower speed threshold, the motor pulse width is increased to increase the speed of shade travel. When the shade speed is within a range defined by the upper and lower speed thresholds, changes in the current pulse width modulation setting are not required.

In practice, the speed threshold as discussed would be established at different time periods, such as, 60 and 65 milliseconds for the lower and upper thresholds, respectively. That time range would be compared with the time between rising edges of successive optical pulses; and, where the time between rising edges of successive optical pulses is greater than the upper threshold, would indicate that the motor speed is too low and would therefore increase the width of the motor drive pulse by a predetermined amount or percentage.

As a preliminary to describing the various sequences, it should also be recognized that there are established both upper and lower normal speed thresholds and upper and lower reduced speed thresholds and one or the other pair of thresholds would be selected according to the nature of the receiver pulse received through the conditioning circuit R. In addition, a "start-up" speed threshold and "stay-on" speed threshold are established in the processor circuit N to determine whether the motor should be turned on or off in response to a given signal. Thus, within a predetermined time interval after the motor is started up, the motion pulse rate must be equal to or greater than a preset constant rate to keep the motor turned on thus indicating that it is above the start-up threshold. Moreover, if once up to speed the motor M should slow down or stop moving and the motion pulse rate should fall below a preset level or "stay-on threshold", power to the motor M is turned off. The latter condition would occur, for example, if the shade reaches a fully open or closed position or run into an obstruction in the path of shade travel. This feature therefore protects the motor from lifting loads outside the design parameters leading to possible damage of the motor or other parts of the system.

Figure 3:
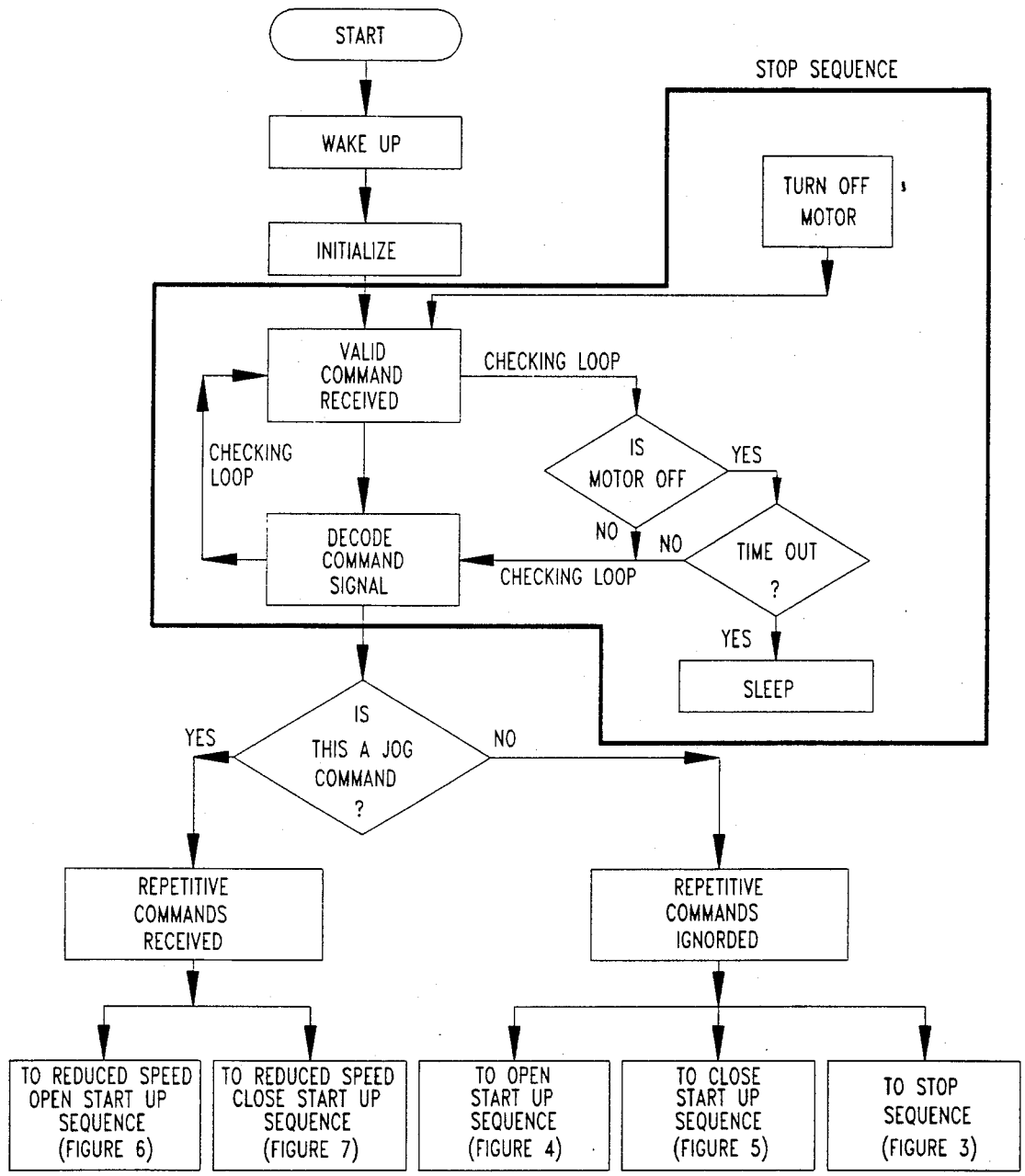
FIG. 3 is a flow chart of the receiving/decoding sequence in the microprocessor of the control circuit in accordance with the present invention.

The receiving/decoding sequence is illustrated in FIG. 3 and begins when the receiver 11 sends a pulse to the limit switch decoder circuit 20. This pulse could be the first pulse in the command signal or just a random electrical pulse called a noise pulse. This pulse "wakes up" the processor N by starting the oscillator O in the processor circuit N. With the ocillator O running, the processor N "initializes" or resets the circuit 20.

The processor N now determines if a "valid command" is received: This routine discriminates between a noise pulse and a command pulse. Noise pulses are electrical spikes which stay at a high voltage for a very short time. Command pulses always stay high longer than noise pulses. Upon receiving a pulse from the receiver N, a counter in circuit N starts counting down to zero. If the pulse goes low before the counter reaches zero, a noise pulse has been detected and is subsequently ignored. If the pulse stays high after the counter reaches zero, the counter is restarted to decode the command pulse.

A command pulse is either long or short which corresponds to the "on" (1) or "off" (0) status of a bit. Upon restart of the count-down cycle, a short command pulse will go low (bit=0) before the counter reaches zero while a long command pulse will remain high (bit=1). The status of this bit is then read and stored. This count-down cycle begins again on the rising edge of the next pulse. If nine bits have been consecutively read and stored, then the complete command word is stored for further decoding. A longer count-cycle is synchronized with the time delay between command words to insure that the first command pulse is stored in the first bit register.

The first five bits in the complete command word identify the station address. If the newly received station address matches either the shade station number or the "all" station address, the last four bits in the command word are decoded. If not, the command is ignored.

The remaining four bits identify the commands OPEN, CLOSE, JOG OPEN, JOG CLOSE and STOP. If the command is JOG OPEN or JOG CLOSE, repetitive commands will be continually processed and monitored in the "JOG" or reduced speed control sequences, FIG. 9. if the command is OPEN, CLOSE or STOP, repetitive commands will be ignored.

The "Stop" Sequence is referenced at least once and sometimes twice in every sequence described in FIGS. 3 through 9. The purpose of the "Stop" Sequence is to put the processor to "sleep" after the motor is turned off. The "sleep" mode occurs when the oscillator O is turned off. Two conditions must be met before the processor can go to "sleep". First, the motor M must be turned off. Second, a "Time Out" period of approximately one second must be completed. During this "Time Out" period, the processor checks to see if a new command is being received. The checking sequence monitors the status of a flag which is set when a receiver pulse is being detected or decoded. The checking sequence loops a set number of times around the "Valid Command Received" and "Decode Command Signal"

routines which determines the length of the "Time Out" period.

The checking sequence begins when the receiver pulse is detected. Checking continues while the motor M is running and ends one "Time Out" period after the motor M is turned off. During motor start-up, the processor N has to stay awake to start the motor and keep it running until the shade stops moving. This sequence occurs as follows: (1) Valid Command Received (pulse detected); (2) "Start Checking Loop"; (3) "Is Motor Off?" - "YES"; (4) "Time Out"? - "NO"; (5) "Checking Loop"; (6) "Decode Command Signal"; (7) "Checking Loop"; (8) "Valid Command Received"; (9) "Checking Loop"; (10) "Is Motor Off?" - "NO"; (11) "Checking Loop" (Checking loop continues while motor is running). When the shade stops moving, the "Stop" Sequence is initiated as follows: (1) "Turn Off Motor"; (2) "Checking Loop"; (3) "Is Motor Off?" - "YES"; (4) "Time Out?" - "NO"; (5) "Checking Loop"; (6) "Is Motor Off?" - "YES"; (7) "Time Out?" - "YES"; "Sleep".

Figure 4:
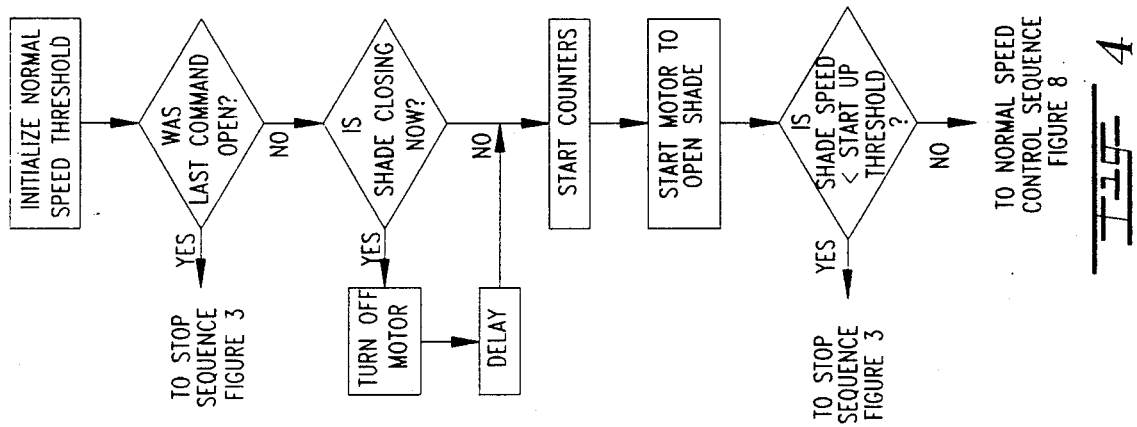
FIG. 4 is a flow chart of the open start-up sequence of the microprocessor.

As illustrated in FIG. 4, the main purpose of the "Open Start-Up" Sequence is to compare the actual start-up shade speed with the "Start-Up Threshold Speed" to determine if an obstruction is present or if the load exceeds designed motor torque capabilities. If either condition is detected by the resultant slow start-up speed, the "Stop" Sequence is executed.

The "Open Start-Up" Sequence begins by the initialization of the "Normal Speed Thresholds". The upper and lower normal speed thresholds define the operating range for normal speed. Initialization of these values is required prior to motor start-up to replace the "Reduced Speed Thresholds" that were set if the last command was JOG OPEN or JOG CLOSE. No initialization is required for the "Start-Up" and "Stay-On" thresholds since these values stay the same for both normal and reduced speed, or jog, modes.

The processor then checks if OPEN was the previous command received and decoded. If the answer is "YES" then the "Stop" Sequence is executed because the shade has reached an end stop and can open no further. The shade cannot be opening at this time since repetitive OPEN commands are ignored. If OPEN was not the last command, then the processor checks if the shade is currently closing. If "YES", then the motor is turned off and a delay occurs which allows the motor to come to a complete stop. If the answer is "NO", then the motor is already stopped.

Both the speed count and the pulse width modulation (PWM) count are started in the microprocessor when the motor is turned on. The PWM count will be described in the "Normal Speed Control" Sequence. The speed count measures the time period in 1 millisecond counts from the point of "motor turn on" to the leading edge of the first optical pulse. The speed count is inversely proportional to the optical pulse rate and shade speed. The "Start-Up Threshold Period" has been set at 200 counts of the speed count which is equal to 200 milliseconds. If the measured speed count of the first optical pulse is less than or equal to the 200 count start-up threshold, then the processor executes the "Normal Speed Control" Sequence since shade speed is not less than the "Start-Up Threshold Speed". If the speed count reaches the 200 count before detecting the first optical pulse, then the "Stop" Sequence is executed because the shade speed is less than the "Start-Up Threshold Speed".

Figure 5:
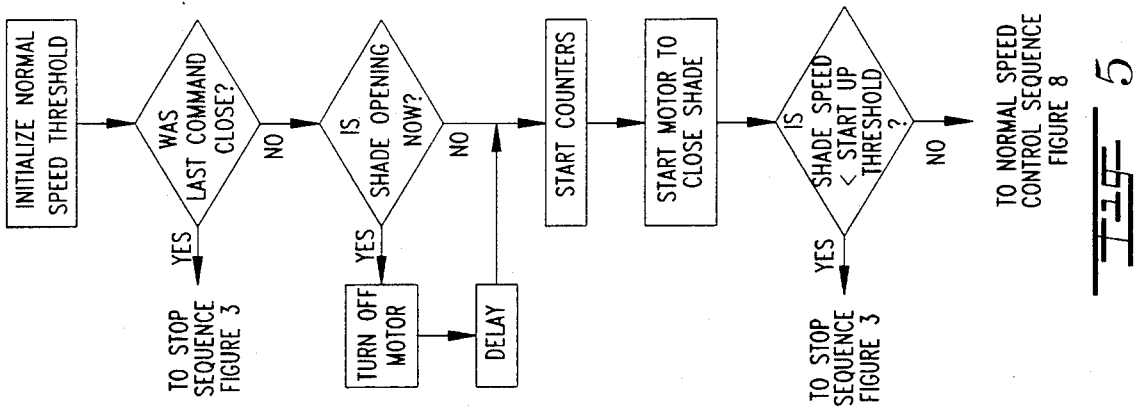
FIG. 5 is a flow chart of the close start-up sequence of the microprocessor.

The "Close Start-Up" Sequence, see FIG. 5, is identical to the "Open Start-Up" Sequence described above when all logical references to opening and closing the shade are reversed.

Figure 6:
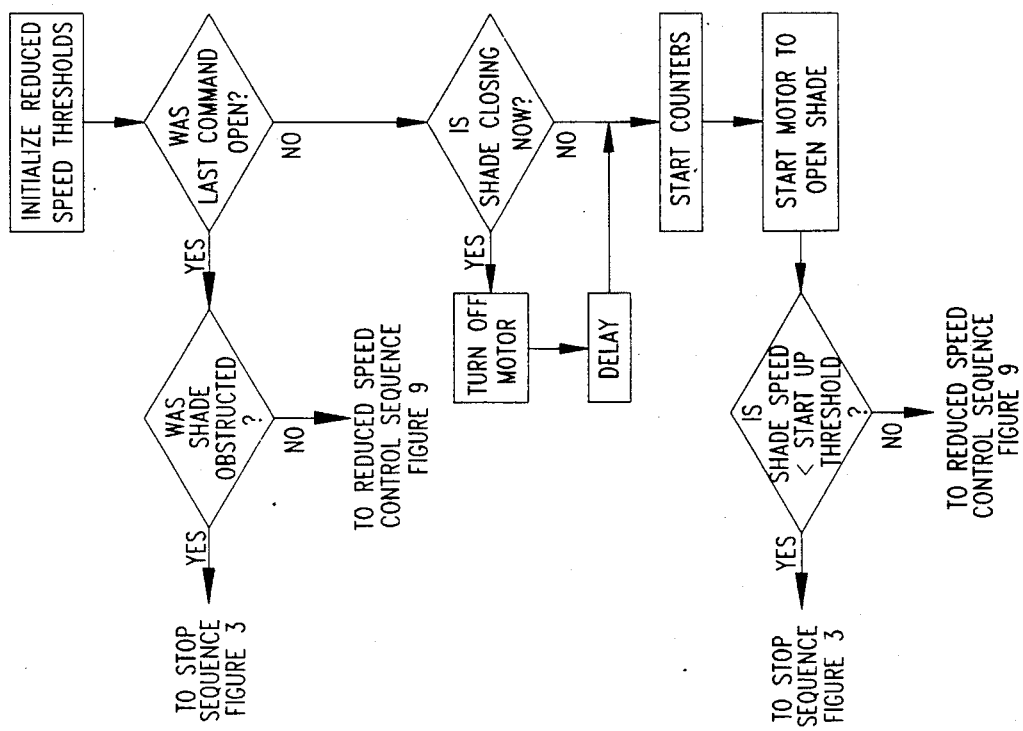
FIGS. 6 and 7 are flow charts of the reduced speed start-up sequence of the microprocessor.

As shown in FIG. 6, the purpose of the "Reduced Speed Open Start-Up" Sequence is identical to the "Open Start-Up" Sequence. Either the "Stop" Sequence or "Reduced Speed Control" Sequence is executed after comparing the actual shade start-up speed with the "Start-Up Threshold Speed". However, the "Reduced Speed Start-Up" Sequence addresses some new conditons which alter the general start-up sequence of events.

The "Reduced Speed Open Start-Up" Sequence begins by initialization of the "Reduced Speed Thresholds". The upper and lower reduced speed thresholds define the operating range for the slower reduced speed. This is required prior to motor start-up to replace the "Normal Speed Thresholds" that were set if the last command was OPEN or CLOSE. As mentioned previously, no initialization is required for the "Start-Up" and "Stay-On" thresholds since these values stay the same for both normal and reduced speeds.

The processor then checks if OPEN was the previous command received and decoded. If the answer is "YES", then the processor checks to see if the shade was obstructed. If the answer is "YES", then the "Stop" Sequence is executed. If the last command was OPEN and the shade was not obstructed, then the shade is currently opening at the normal speed., Given this condition, the processor executes the "Reduced Speed Control" Sequence. This slight variation allows the user to reduce shade speed from normal speed to reduced speed without stopping the shade. If OPEN was not the last command, then the processor checks if the shade is currently closing. If "YES", then the motor is turned off and a delay occurs which allows the motor to come to a complete stop. If the answer is "NO", then the motor is already stopped.

The remaining portion of the "Reduced Speed Open Start-Up" Sequence (i.e. "Start Counters", "Start Motor to Open Shade" and "Is Motor Start-Up Speed less than "Start-Up Threshold Speed") is identical to the "Open Start-Up" Sequence described in the previous section.

Figure 7:
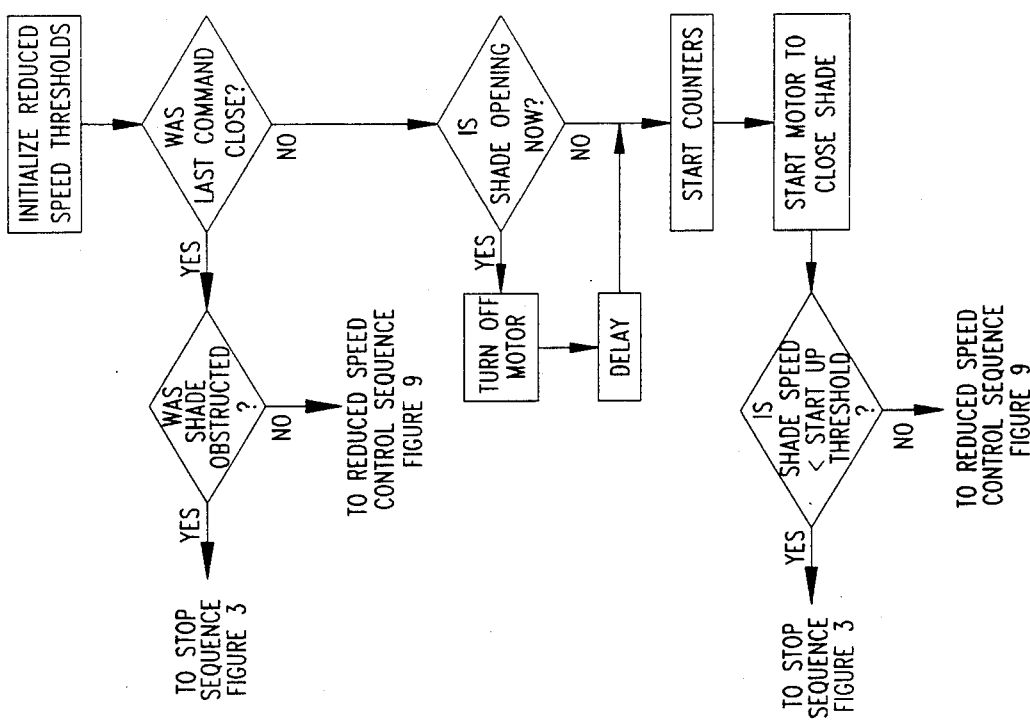

The "Reduced Close Start-Up" Sequence, FIG. 7, is identical to the "Reduced Speed Start-Up" Sequence described above when all logical references to opening and closing the shade are reversed.

Figure 8:
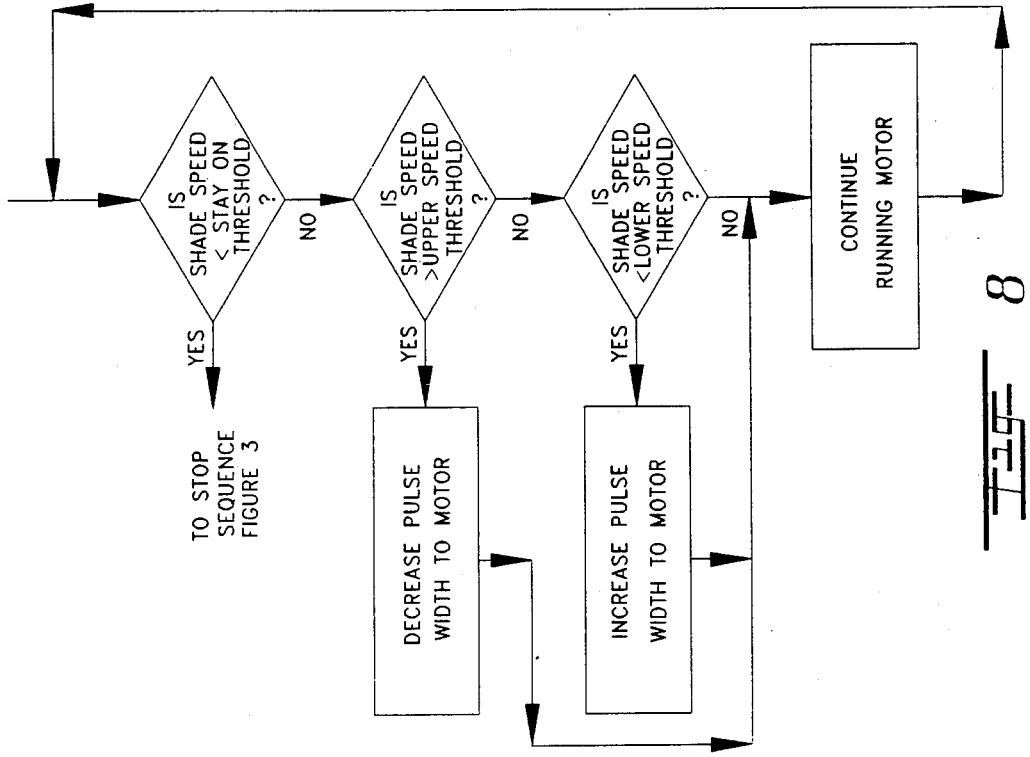
FIG. 8 is a flow chart of the normal speed control sequence of the microprocessor.

As illustrated in FIG. 8, the purpose of the "Normal Speed Control" Sequence is to regulate and maintain shade speed between the upper and lower threshold speeds for normal speed. The "Normal Speed Control" Sequence is executed when the conditions of successful shade start-up have been met from either the "Open" or "Close Start-Up" Sequence. Normal speed is selected when an OPEN or CLOSE command has been received and decoded.

As described earlier in the "Open Start-Up" Sequence, both the speed count and the PWM count are started when the motor is turned on. The speed count measures the time period between optical pulses in terms of 1 millisecond counts. The upper and lower threshold periods for normal speed are initialized in terms of speed count value in the same way that the "Start-Up Threshold Period" is set at 200 speed counts. Normal speed is regulated between the upper threshold of 28 speed counts and the lower threshold of 25 speed counts. The speed counter resets and starts a new counting cycle at every optical pulse occurence. The "Stay-On" threshold period is set at a constant value of 140 speed counts.

The PWM count establishes the pulse width of the signal waveform which powers the motor in response to the pulses received from the optical interruption circuit D. The PWM count counts at a rate of 1 microsecond per count. The fixed time period "T", shown in FIGS. 11A through 11C, has been set at 1 millisecond which corresponds to 1000 counts of the PWM count. With this method of servo speed control, the maximum "POWER ON" pulse width setting must be less than the fixed time period "T". In practice, the selected maximum pulse width setting is 990 PWM counts, see FIG. 10A, which keeps power on for 99% of the time. The minimum pulse width setting shown in FIG. 10B is 100 PWM counts which corresponds to power on for 10% of the time.

It is also necessary to establish the initial pulse width setting for "normal speed" and "reduced speed" to be used in initial start-up. These initial pulse width settings are determined through previous experiments with the largest sized shade which equals the maximum design condition. For example, the initial pulse width setting for "normal speed" should operate on the largest size shade within the upper and lower thresholds for normal speed. The same criteria applies to the JOG mode, where the initial reduced speed pulse width setting is selected based on the reduced speed thresholds. These initial pulse width settings are used when the shade is powered up for the first time. Once the shade is actually traveling at the desired speed either at the normal or reduced speeds, the microprocessor N determines and stores the actual pulse width setting for that specific direction of shade travel. This new initial pulse width setting is used the next time the shade is operated in the same direction and speed mode. A unique initial pulse width setting is determined and stored for each command; i.e., OPEN, CLOSE, JOG OPEN or JOG CLOSE, each time the desired speed is achieved. This approach enables constant shade speed notwithstanding changes in parameters, such as, shade size, orientation and temperature. When servo speed control is required, the pulse width can be increased or decreased a specified number of PWM counts during each optical pulse occurence.

The "Normal Speed Control" Sequence begins by checking if the shade speed is less than the "Stay-On" threshold. If the answer is "NO", then the processor checks if the shade speed is greater than the upper threshold speed. If the answer is "YES", then the pulse width is decreased by 1% and the processor bypasses a speed comparison with the lower threshold speed. The motor continues to run and the loop is repeated until the shade speed is reduced below the upper threshold speed. If the shade speed falls below the lower threshold speed, then the pulse width to the motor is increased. The loop continues until the shade speed is less than the "Stay-On" threshold speed. When this occurs, the "Stop" Sequence is executed because the shade has stopped moving.

Figure 9:
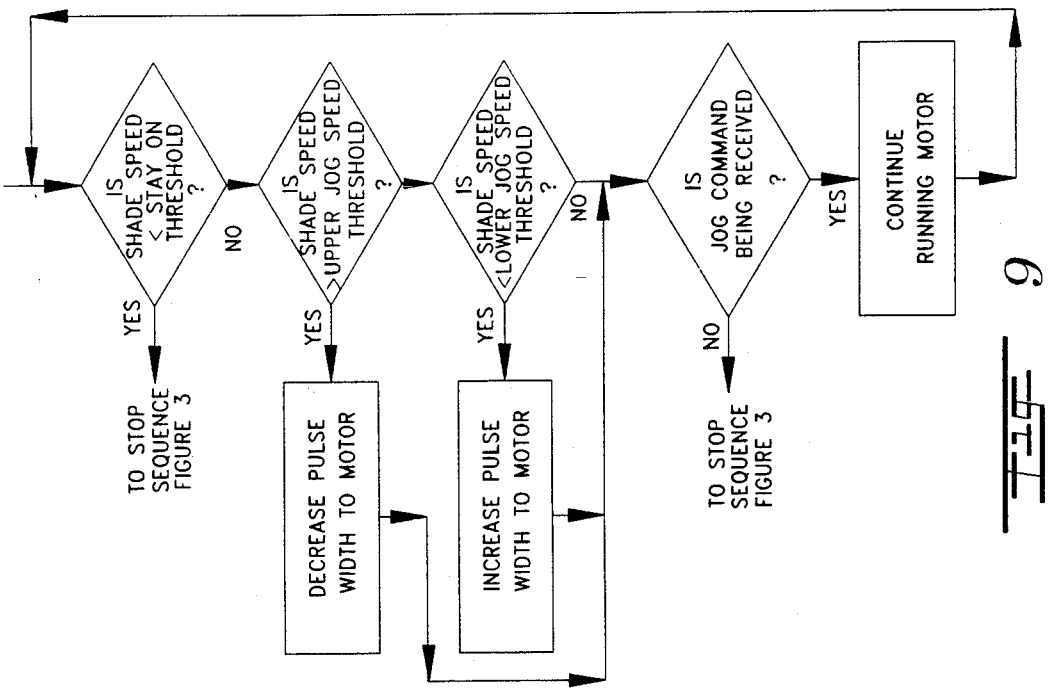
FIG. 9 is a flow chart of the reduced speed control sequence of the microprocessor.

As shown in FIG. 9, the purpose of the "Reduced Speed Control" Sequence is to regulate and maintain shade speed between the upper and lower threshold speeds which define reduced speed. The "Reduced Speed Control" Sequence is executed when the conditions of successful shade start-up have been met either from the "Reduced Speed Open" or "Reduced Speed Close Start-Up" Sequence. Reduced speed is selected when a JOG OPEN or JOG CLOSE command has been received and decoded.

As described earlier in the "Open Start-Up" Sequence, both the speed count and the PWM count are started when the motor is turned on. The upper and lower threshold periods for the reduced speed are initialized in terms of the speed count in the same way that the "Start-Up Threshold Period" is set at 200 speed counts. Reduced speed may be regulated between the upper threshold of 70 speed counts and the lower threshold of 66 speed counts. The speed counter resets and starts a new counting cycle at every optional pulse occurence. The "Stay-On" threshold period is set at a constant value of 140 speed counts.

The description of the PWM count in the "Normal Speed Control" Sequence is identical for the "Reduced Speed Control" Sequence to achieve servo speed control. The primary difference between the "Reduced Speed Control" Sequence and the "Normal Speed Control" Sequence is that repetitive JOG commands are continually received when the transmitter command key sending the JOG OPEN or JOG CLOSE command signal is held down continuously.

The "Reduced Speed Control" Sequence begins by checking if the shade speed is less than the "Stay-On" threshold. If the answer is "NO", then the processor checks if the shade speed is greater than the upper threshold speed. If the answer is "YES", then the pulse width is decreased by 1% and the processor bypasses a speed comparison with the lower threshold speed. The processor then checks if the JOG command is being received. If the answer is "YES", then the motor continues to run and the loop is repeated until the shade speed is reduced below the upper threshold speed. If the shade speed falls below the lower threshold speed, the pulse width to the motor is increased. The loop continues until the shade speed is less than the "Stay-On" threshold speed or the JOG command is no longer received. If either condition occurs, the "Stop" Sequence is executed.

It will therefore be evident from the foregoing description of a preferred form of invention that a motion detection switch has been devised which is highly sensitive to changes in speed of a member to be driven either to change the speed of a motor drive or to stop the motor drive in the event of an obstruction which might otherwise damage or overload the system. Accordingly, the foregoing description of a preferred form of motor controller for a window blind may have innumerable other applications and is therefore given by way of illustration and not limitation.

It is therefore to be understood that various modifications and changes may be made in the specific steps comprising the method and the elements comprising the apparatus of the present invention without departing from the spirit and scope thereof as defined by the appended claims and any ressonable equivalents.

We claim:

1. In motion control apparatus wherein a member is driven along a predetermined path of travel and motor drive means having a maximum speed level is provided for reversibly driving said driven member, the improvement comprising:

speed-sensing means connected to said driven member for sensing the rate of advancement of said driven member along said path of travel and for generating signals proportional to the speed of said driven member;

control means for establishing a predetermined speed level at which said driven member is to be driven, said control means also establishing a minimum speed level in addition to said predetermined speed level, and deactivating means for reactivating said motor drive means when the rate of advancement as sensed by said speed-sensing means is below said minimum speed level, said control means establishing first and second speed levels which define upper and lower limits within which said driven member is to be driven, said upper limit being less than the maximum speed level of said motor drive means;

signal generating means for generating drive signals which are proportional to the signals generated by said speed-sensing means and for driving said motor drive means; and comparator means for comparing the rate of advancement of said driven member as sensed by said speed-sensing means and the speed levels established by said control means to adjust said drive signals until the rate of advancement of said driven member corresponds with said predetermined speed level.

2. In motion control apparatus according to claim 1, wherein said speed-sensing means rotating at a speed correlated with the rate of advancement of said driven member, and said signal-generating means generating signals in the form of electrical pulses, said comparator means adjusting the width of said electrical pulses until the rate of advancement of said driven member corresponds to said predetermined speed level.

3. In motion control apparatus according to claim 1, wherein said speed-sensing means including a slotted optical disk and a light beam directed across the path of rotation of said disk.

4. In motion control apparatus according to claim 1, wherein said motor drive means includes a reversible DC motor drive, and a bridge circuit for reversing the polarity of said DC motor drive in response to the drive signals received from said signal generating means.

5. In motion control apparatus according to claim 1, wherein said signal-generating means including a switch modulation circuit having a closed feed-back loop connected to said speed-sensing means for modulating the width of said drive signals in the form of electrical pulses for driving said motor drive means.

6. In a motion control system wherein a member is to be driven along a predetermined path of travel and motor drive means is provided for reversibly driving said driven member, said motor drive means being accelerated and decelerated in direct proportion to the width of motor drive pulses received, the improvement comprising:

rotary speed sensing means connected to said driven member for rotation at a speed correlated with the speed of advancement of said driven member along said path of travel, and for generating electrical pulses at a rate corresponding to the rate of advancement of said driven member;

motor drive pulse-generating means for generating the motor drive pulses of a width corresponding to the rate of advancement sensed by said speed sensing means and for driving said motor drive means; and comparator means electrically connected between said motor drive means and said pulse-generating means for comparing the rate of advancement of said driven member with a predetermined speed level and for adjusting the width of said motor drive pulses until the rate of advancement of said driven member corresponds with said predetermined speed level, said motor drive means including a DC motor drive, and speed control means for modulating power output to said motor drive over a fixed repeating time period in response to the rate of advancement of said member to be driven, said speed control means defined by a pulse width modulation circuit having a closed feedback loop connected to said speed sensing means, and said comparator means having upper and lower speed thresholds to define the boundaries of an acceptable speed range for either normal or reduced speeds.

7. In a motion control system according to claim 6, wherein said speed sensing means includes a slotted optical disk and a light beam directed across the path of rotation of said disk.

8. A method of controlling the speed of advancement of a window shade between open and closed positions and for stopping the movement of the shade in the event of an obstruction, including a drive member for reversibly driving said shade, comprising the steps of:

sensing the rate of advancement of said shade when said drive member is activated;

establishing upper and lower normal speed levels within which said shade is to be advanced by said drive member;

further establishing a minimum speed level below which said drive member is deactivated;

comparing the rate of advancement of said shade with said upper and lower normal speed levels and adjusting the rate of advancement of said shade until it is between said upper and lower normal speed levels; and deactivating said drive member in the event that the rate of advancement is below said minimum speed level.

9. The method according to claim 8, further including the steps of establishing upper and lower reduced speed levels, comparing the rate of advancement of said shade with said upper and lower reduced speed levels and adjusting the rate of advancement of said shade until it is between said upper and lower reduced speed levels.

* * * * *

UNITED STATES PATENT AND TRADEMARK OFFICE
CERTIFICATE OF CORRECTION

PATENT NO.   :   5,170,108
DATED        :   8 December, 1992
INVENTOR(S)  :   Peterson, J. E. et al It is certified that error appears in the above-identified patent and that said Letters Patent is hereby corrected as shown below:

Column 11, line 7    Cancel "reactivating" and substitute -- deactivating --

Signed and Sealed this

Fourth Day of January, 1994

Attest:

BRUCE LEHMAN

*Attesting Officer*          *Commissioner of Patents and Trademarks*